Patented Jan. 6, 1931

1,787,611

UNITED STATES PATENT OFFICE

LAWRENCE BRADSHAW, OF BAINBRIDGE, NEW YORK, ASSIGNOR, BY MESNE ASSIGNMENTS, TO THE CASEIN MANUFACTURING COMPANY OF AMERICA, INC., OF NEW YORK, N. Y., A CORPORATION OF DELAWARE

ADHESIVE

No Drawing. Application filed June 8, 1927. Serial No. 197,524.

The present invention relates to improvements in adhesive materials. Adhesives containing casein or other protein or proteaginous material, with alkali metal compounds of an alkaline character as solvents therefor, with or without lime as a waterproofing agent therefor together with water, are well known. Casein has long been used as the protein base of adhesives and, more recently, proteaginous glues have been made from proteaginous seed meals such as soybean meal. Casein, when used with lime in certain proportions, preferably together with alkali metal salts, and a suitable amount of water gives an adhesive product which is relatively water-resistant after drying, so that for instance, plywood glued up with it and dried can be soaked in water for several days without considerable separation of the joint. When, however, seed meals containing vegetable proteins are substituted for the casein, and the same relative proportion of lime is used, the water-resisting properties are usually inferior; and an important object of the present invention is to improve the water-resisting properties of such glues. A further object is to improve those casein glues which, on account of their relatively low lime content, are not fully waterproof.

In accordance with the present invention I have found that the water-resisting properties of those adhesives which contain vegetable protein or proteaginous substances can be greatly improved, and the water-resisting properties of casein glues can be somewhat improved by the addition of starch-viscose. I have also found that in both these cases the strength of the glued joint is materially increased by the addition to the glue of the starch-viscose.

Methods of making starch-viscose from starch have been described in the literature, and I may employ any suitable method for producing the starch-viscose.

As examples of methods which have been found to give satisfactory results the following may be cited: Similar methods have been published in chemical journals, and it is to be understood that the examples are given by way of illustration only, and are not claimed as a part of the present invention. (a) 500 grams of cassava starch are suspended in about 1250 grams of carbon disulphide and to this is added (as a single addition in a continuous stream) a cold solution of 370 grams caustic soda in 2600 ccs. of water, with good agitation. The stirring is continued for about 20 minutes after which the product is set aside in a cool place for 12 to 24 hours. During this period the product "ripens" and assumes a brilliant orange color; its consistency is that of a thin jelly which on vigorous stirring becomes sufficiently fluid to pour. The product may be used in this form or it may be purified by precipitation in alcohol and re-dissolving in water.

In the present specification and claims, I use the term "starch-viscose" to cover a product produced by the joint action of carbon disulphide and caustic alkali on starch. The starch-viscose can be used in the dry state, or in solution. Thus, instead of isolating the viscose, the mother solution resulting from the reaction of the compounded substances may be added directly to the glue.

The starch-viscose can be added to seed-meal glues or to casein glues, at any appropriate stage of the process, but the preferred procedure is to mix the glue base first with cold water in the desired proportions, and after stirring for about 15 minutes to add the viscose and continue stirring for about 5 minutes more. The glue is then ready for use.

The amount of the starch-viscose added may vary between rather wide limits. When using a starch-viscose solution containing about 6% of starch, I find that the addition of an amount of this solution equal to about one-tenth of the weight of the original dry glue base gives very satisfactory results, but various amounts between 5 and 25% may be used.

The following examples are given to illustrate the making of glues suitable for plywood. In each case the given amounts of starch-viscose solution relate to a solution containing about 6% of starch. The numerals indicate the parts by weight.

*Example 1.*—80 casein, 11 hydrated lime, 3 trisodium phosphate, 3 sodium fluoride, and 3 sodium carbonate. These are mixed together to form a glue base. This base is then thereafter mixed with 200 parts of water; and well stirred; 10 parts of the starch-viscose solution are added, and the stirring continued as indicated above.

*Example 2.*—40 casein, 40 soybean meal (containing about 5% of residual oil), 10 hydrated lime, 1 borax, 2 sodium carbonate, 1 trisodium phosphate, 6 sodium fluoride. After adding the water and stirring, 8.5 parts of the starch-viscose solution are added, and the mixture well stirred.

*Example 3.*—27 casein, 53 peanut meal (containing about 6% of residual oil), 2 sodium sulfite, 3 sodium carbonate, 11 hydrated lime, and 4 sodium fluoride. This mixture is dissolved as above described and 11 parts of the starch-viscose solution added, with stirring.

*Example 4.*—75 parts soybean meal (containing about 6% of residual oil), 15 hydrated lime, 5 sodium fluoride, 3 trisodium phosphate and 2 sodium carbonate. After dissolving in an aqueous vehicle, preferably tap water, 9 to 12 parts of starch-viscose solution are added and the glue is well stirred.

It will be understood that in the preparation of the glues, the above are merely examples. Various other chemical substances such as are commonly used in the art, can be employed, and the proportions can be varied to suit particular conditions.

I have referred above to proteaginous seed meals. It is preferred to use the commercial press cake, or the press cake from which the residual oil has been extracted with gasoline or other oil-solvent, ground to a fine mesh. The seed meal should preferably not contain more than about 5 to 10% of oil. Instead of the seed meals above mentioned, I may use other meals relatively rich in protein, e. g. cottonseed meal.

I claim:

1. An adhesive composition suitable for gluing up plywood comprising an alkali-soluble protein, an alkali in at least sufficient amount to dissolve the same, starch-viscose and water.

2. An adhesive composition suitable for gluing up plywood comprising a seed-meal containing a proteid material, an alkali in at least sufficient amount to dissolve the protein, starch-viscose, and water.

3. An adhesive composition suitable for gluing up plywood comprising a glue base containing a proteaginous seed-meal and casein together with an alkali in amount at least sufficient to dissolve the protein content thereof, starch-viscose, and water.

4. An adhesive composition comprising casein, an alkali in at least sufficient amount to dissolve the same, lime, starch-viscose and water, such adhesive composition being suitable for gluing up plywood to give water-resisting joints.

5. An adhesive composition comprising a seed-meal containing a proteid material, an alkali in at least sufficient amount to dissolve the protein, lime, starch-viscose and water, such adhesive composition being suitable for gluing up plywood to give water-resisting joint.

In testimony whereof I affix my signature.
LAWRENCE BRADSHAW.